United States Patent [19]

Connor

[11] 4,176,673
[45] * Dec. 4, 1979

[54] PURGED SLIDING GATE VALVE

[75] Inventor: Peter J. Connor, Bethlehem, Pa.

[73] Assignee: Mosser Industries, Inc., Bethlehem, Pa.

[*] Notice: The portion of the term of this patent subsequent to Jun. 6, 1995, has been disclaimed.

[21] Appl. No.: 862,133

[22] Filed: Dec. 19, 1977

Related U.S. Application Data

[63] Continuation-in-part of Ser. No. 802,892, Jun. 2, 1977, Pat. No. 4,093,245.

[51] Int. Cl.² ............ F16K 3/02; F23L 13/06
[52] U.S. Cl. ............ 137/240; 126/285 A; 251/174; 251/328
[58] Field of Search ............ 126/285 A; 138/94, 94.3; 251/326, 327, 328; 137/240

[56] References Cited

U.S. PATENT DOCUMENTS

| | | | |
|---|---|---|---|
| 2,964,036 | 12/1960 | Lowe | 126/285 A |
| 2,996,063 | 8/1961 | Lowe | 126/285 A |
| 3,228,389 | 1/1966 | Lowe et al. | 126/285 A |
| 4,022,241 | 5/1977 | Fox | 251/328 X |
| 4,093,245 | 6/1978 | Connor | 277/237 R |

Primary Examiner—Martin P. Schwadron
Assistant Examiner—Richard Gerard
Attorney, Agent, or Firm—Sutherland, Asbill & Brennan

[57] ABSTRACT

A sliding gate valve comprising a housing; a sliding gate; an enclosed void space between the gate side edges and the wall of the housing when the gate is in the closed position; and a purge line for injecting pressurized fluid into the void space; improved by gate side edge sealing means comprising a downstream seat mounted on the interior wall of the housing and an upstream seat assembly comprised of a rigid, elongated channel on the interior wall of the housing, parallel to, and upstream of, the gate when in the valve-closed position, the channel having a back wall and at least one side wall, the back wall being substantially parallel to the gate; a rope positioned lengthwise in the channel; the channel having an elongated metal strip flexibly attached along the first of its two long edges to a side wall of the channel so as to sandwich the rope between the back wall of the channel and the rear surface of the metal strip; the seat assembly being positioned such that when the gate is closed the gate's upstream face presses against the front surface of the metal strip, urging the strip against the rope, the resilience of the rope providing a pressure counter to that exerted by the gate member; the downstream seat and upstream seat assembly being so adapted that upon withdrawal of the gate member from the housing, the metal strip's front surface is urged against the downstream seat in sealing engagement, effectively closing the void space.

21 Claims, 8 Drawing Figures

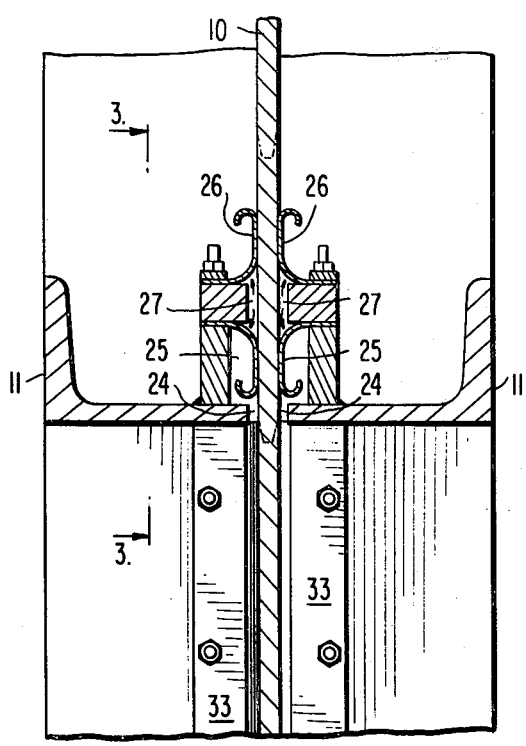
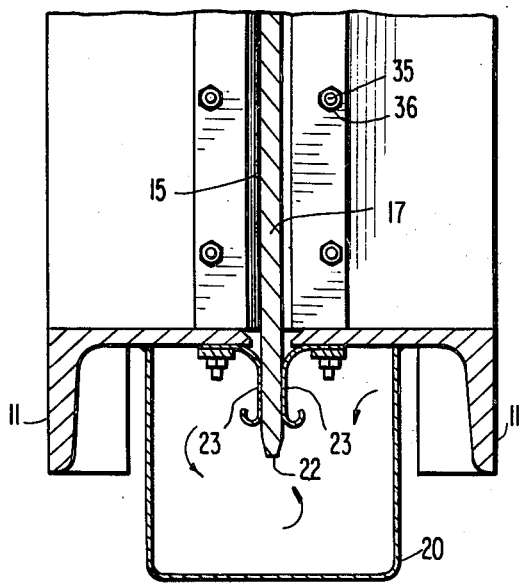
FIG.2
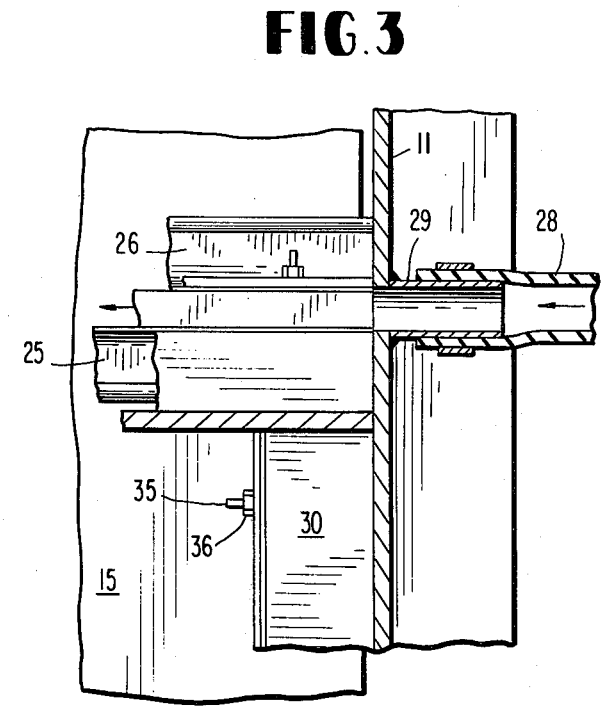
FIG.3
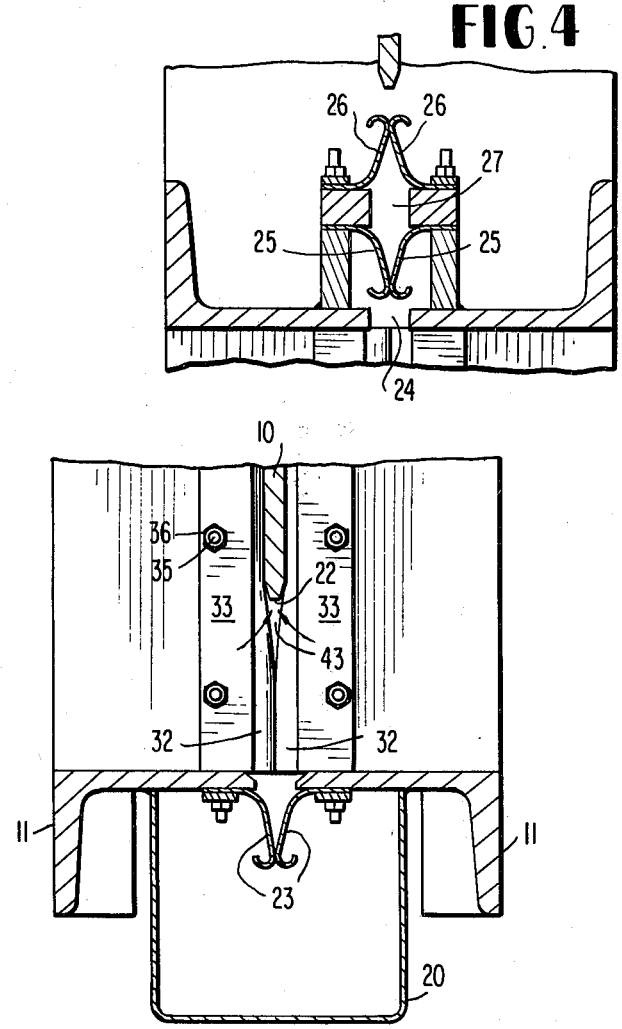
FIG.4
FIG.5

U.S. Patent Dec. 4, 1979 Sheet 3 of 3 4,176,673
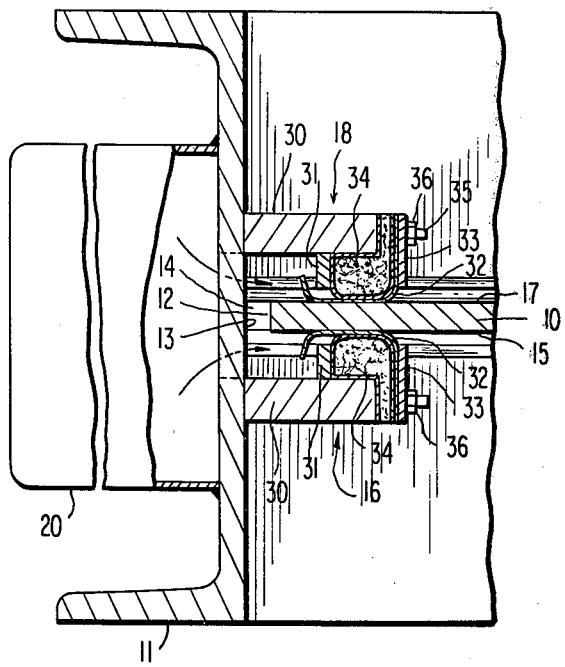
FIG.6
FIG.7
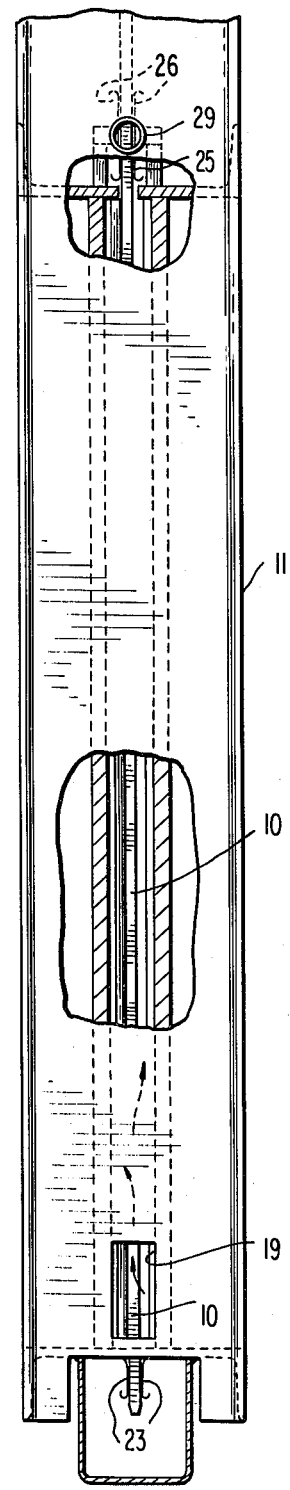
FIG.8

PURGED SLIDING GATE VALVE

This application is a continuation-in-part of my co-pending U.S. patent application Ser. No. 802,892, filed June 2, 1977 now U.S. Pat. No. 4,093,245.

The subject matter of the invention is sliding gate valves having purge seals along the side edges of the gates. More particularly, the invention relates to improved purge seals for such valves.

A sliding gate valve, also called a guillotine valve or damper, is a valve comprised of a housing having an aperture in its side and a gate member which is adapted for sliding movement through the aperture between valve-open position, wherein the gate member is withdrawn from the housing, and valve-closed position, wherein the gate member extends through the aperture and into the housing to restrict the flow of fluid through the housing. The valve is used to control fluid flow, most often in gas conduits. Sliding gate valves are frequently employed as flue gas dampers.

To increase the effectiveness of a sliding gate valve in the closed position, it is known to provide some means forming an enclosed void space between the edges of the gate member, when in the closed position, and the interior wall of the housing, together with sealing means cooperating with the member to seal against the leakage of upstream and downstream fluids into the void space, and to inject a fluid, for example air, into the void space under a greater pressure than that which the upstream fluid is under. The pressurized fluid in the void space, which might also be called a purge chamber, will steadily seep through any imperfections in the seal around the gate's edges, preventing the lower pressure upstream fluid from leaking past the gate. However, despite the constant flow of purge fluid, if the valve is used to control the flow of a fluid which contains suspended solids, e.g., the fly ash in flue gas from coal fired boilers, then some of those solids will invariably be deposited in the purge chamber and, over a period of time, will collect there in such quantity as to impair the operation or effectiveness of the valve. By the present invention is provided a means for making such valves self-cleaning, that is, a means by which the solids which find their way into the purge chamber during operation of the valve can be expelled from the chamber without disassembly of the valve or use of special equipment.

The present invention resides in the use of particular sealing means for the side edges of the gate member of the valve just described, which keep the purge chamber along the side wall of the housing closed when the gate member is fully withdrawn from the housing, and closed as well when the gate member is fully inserted in the housing, but which provide a small, triangular opening in front of the forward edge of the gate member when the gate member is moved between the open and closed positions. By "side edges" is meant opposite edges of the gate member which are parallel to the direction of sliding movement of the gate member.

To expel collected solids from the purge chamber of the valve of the present invention, the means for pressurizing the chamber, e.g., an air fan, is activated and the gate member is moved from one extreme position to the other. As the gate member moves, and the small opening is formed in the purge chamber in front of the gate member's forward edge, the purge fluid escapes as an extremely high velocity jet of fluid, e.g., air, through the opening and into the housing proper, creating a swirling motion in the purge chamber which tosses up the deposited solids and causes them to be expelled with the escaping purge fluid. When the gate member reaches its fully open or closed position, the small triangular opening in the purge chamber closes and the solids expulsion ceases.

The sealing means for the side edges of the gate member comprise a downstream seat and an upstream seat assembly. The downstream seat is mounted on the interior wall of the valve housing in such a manner that the downstream face of the gate member abuts against the seat when in the valve-closed position. The upstream seat assembly comprises a rigid, elongated channel means mounted on the interior wall of the housing in such a manner that the channel is parallel to and upstream of the gate member when in the valve-closed position, the channel having a back wall and at least one side wall, the back wall being substantially parallel to the plane of the gate member, and a rope which is resiliently compressible across its width positioned lengthwise in the channel, an elongated metal strip, with opposing front and rear surfaces, being flexibly attached along the first of its two long edges to a side wall of the channel so as to sandwich the rope between the back wall of the channel and the rear surface of the metal strip. The upstream seat assembly is positioned such that when the gate member is in the valve-closed position the gate member's upstream face presses against the front surface of the metal strip in sealing engagement therewith, urging the strip against the rope, which is supported by the back wall of the channel, the resilience of the rope providing a pressure counter to that exerted by the gate member, the downstream seat and upstream seat assembly being so adapted that upon withdrawal of the gate member from the housing, the metal strip's front surface is urged against the downstream seat in sealing engagement therewith, effectively closing the purge chamber.

The downstream seat can be any internal flange-like structure, rigid or flexible, but preferably it is provided by an assembly which is the mirror image of the upstream seat assembly.

The small triangular opening in the purge chamber which forms in front of the moving gate member is caused by the wedge-like action of the forward edge of the gate member, separating the upstream seat assembly's flexible metal strip from the downstream seat. The thicker the gate member, or the more blunt its forward edge, the longer will be the base of the triangular opening.

The greater the length of the purge chamber, or chambers, the tighter will be the seal against the upstream fluid when the gate member is in the valve closed position. Thus, the purge chamber will normally run substantially the entire length of both of the side edges of the gate member. To optimize the valve's sealing capabilities there can be purge chambers completely surrounding the periphery of the gate member. Thus, in a valve having a rectilinear housing and gate member, purge chambers may advantageously run along the top, bottom, and both side edges of the gate member when in the closed position.

The rigid channel means in the upstream seat assembly of the valve of the present invention has at least two walls and provides a rigid holder for the compressible rope. For example, in cross section the channel can be generally L shaped, V shaped, or U shaped. The channel can be provided by a variety of different means, so long as it will serve as a rigid receptacle for the compressible rope. Thus, for instance, it can be provided by a Z bar welded or bolted to the interior wall of the valve housing, or it can simply be an inside corner in the housing. Preferably it will be generally U shaped in cross section, so that the rope will be tightly held by the channel and completely enclosed when the metal strip is positioned across the opening of the U.

The rope can be formed of any resilient material, such as wire mesh or an elastomer, which will withstand the conditions of use of the valve. If, for instance, the valve is a damper to be used in ductwork for transporting flue gases from a coal burning power plant, then the rope material should be capable of withstanding temperatures of, say, about 300 to 1000 degrees F. In some applications even higher temperatures, e.g., up to about 1500 degrees F., may be encountered, in which case the rope material should be selected accordingly.

Suitable elastomers for the rope material include, for example, silicone rubber and elastomeric copolymers of vinylidene fluoride and hexafluoropropylene.

Suitable wire mesh for construction of the rope includes mesh made of steel or other alloys such as Inconel or Monel.

When wire mesh is used as the rope it is best that it be ensheathed in a braided or woven fabric, to help hold it together.

Ideal rope materials for use in the sealing means of the present invention are "tadpole seals", so-called because in cross section their shape resembles the outline of a frog larva. The flat portion of a tadpole seal provides a means of attachment without deformation of the bulb portion. Usually, such material is composed of a core section and a cover. Suitable examples include asbestos core with braided asbestos cover (for temperatures up to 500 degrees F.), asbestos core with silicone impregnated, braided asbestos cover (for temperatures up to 550 degrees F.), steel mesh core with braided asbestos cover (for temperatures up to 700 degrees F.), stainless steel mesh core with woven glass fiber cover (for temperatures up to 800 degrees F.), stainless steel mesh core with fine weave asbestos cover (for temperatures up to 1000 degrees F.), ceramic fiber core with double braided Inconel cover (for temperatures up to 1800 degrees F.), and ceramic fiber or Inconel mesh core with ceramic woven cover (for temperatures up to 2000 degrees F.).

The elongated (preferably rectangular) metal strip employed in the valve of the present invention can be formed of any metallic stock which will provide a surface for seating against the face of the gate member and which will resist corrosion in the environment of use and withstand the temperatures of use. Spring tempered metal is preferred, e.g., shim stock of steel or other alloy. The metal strip should be made of material that is heavy enough to hold up under repeated opening and closing of the seal, yet thin enough, for example about 0.005 to 0.02 inch, to conform the surface irregularities of the gage member.

Attachment of the metal strip to the channel can be by any means which will permit flexing of the strip with respect to the side wall, by which is meant partial rotation of the strip about a fixed, longitudinal axis, toward and away from the back wall of the channel. An excellent mode of attachment is provided when the strip has a longitudinal bend in it. One of the planes of the bent strip can be attached face-to-face to a side wall of the channel; the bend will provide the axis, or point of flexure, and the other plane of the strip will provide the section that separates the rope from the face of the gate member.

Advantageously, the second long edge of the elongated metal strip, i.e., the edge which is opposite the edge attached to the side wall of the channel, is unattached, giving the strip broad freedom of movement in the direction perpendicular to the back wall of the channel. It is often desirable, however, to put a longitudinal bend, e.g., up to 90 degrees, in the strip, adjacent to the unattached long edge and directed toward the back wall of the channel. One purpose of the bend is to prevent the gate member from catching the unattached edge of the metal strip and possibly deforming the strip or tearing it loose from the channel means. In a guillotine damper, for example, encrustation on the face of the blade might catch the unattached edge of the strip during blade movement, were there not a marginal bend in the strip, away from the blade face, such as described.

The present invention will be better understood by reference to the attached drawings.

In the drawings,

FIG. 2 is an enlarged side view, along line 2—2, partially in cross-section and partially broken away, of the valve depicted in FIG. 1.

FIG. 3 is a front view, along line 3—3, of the right-hand portion of the top seal assembly of the valve depicted in FIGS. 1 and 2.

FIG. 4 depicts the top seal assembly in FIG. 2, but with the gate member completely withdrawn from the valve housing.

FIG. 5 depicts the bottom seal assembly in FIG. 2, but with the valve in an intermediate position between fully open and fully closed.

FIG. 6 is a top view, along line 6—6, of the side seal assembly of the valve depicted in FIGS. 1 and 2.

FIG. 7 depicts the side seal assembly of FIG. 6, but in the valve-open position.

FIG. 8 is an enlarged side view along line 8—8, partially broken away, of the valve depicted in FIG. 1.

Figure 1:
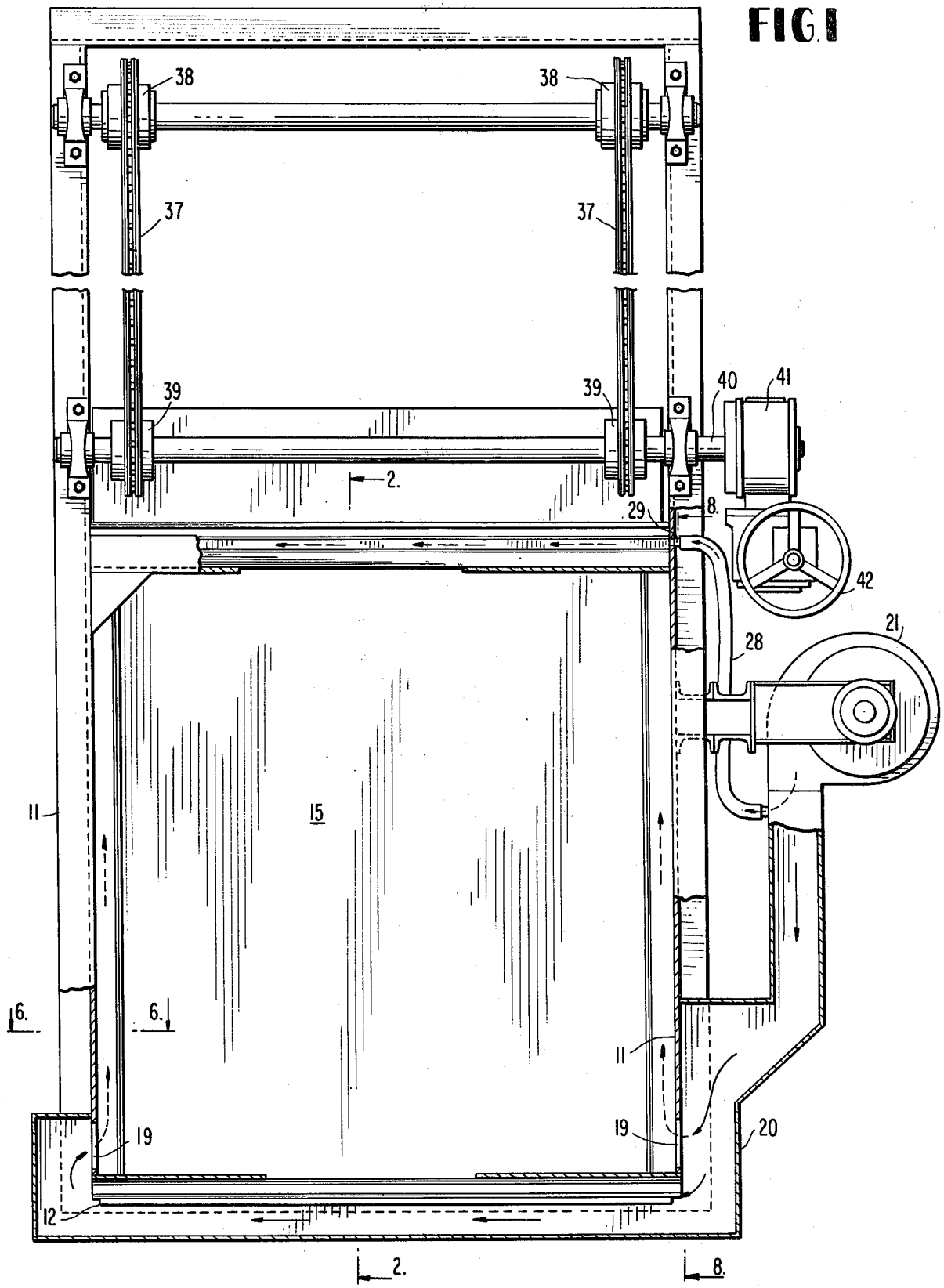
FIG. 1 is a front view, partially broken away and partially in cross-section, of a guillotine valve of the present invention in the valve-closed position.

Referring in more detail to FIGS. 1, 2, 3, 6, and 8, blade 10 is there shown fully inserted in housing 11. Between side edge 12 of blade 10 and interior wall 13 of housing 11, when in the valve-closed position, is a void space 14, which is separate from the upstream face 15 of blade 10 by the seal assembly indicated generally by reference numeral 16, and is separated from the downstream face 17 of blade 10 by the seal assembly indicated generally by reference numeral 18. Openings 19 through housing 11 serve to connect void space 14 with air duct 20, which is supplied with purge air by fan 21.

At the bottom of housing 11, the forward edge 22 of blade 10 protrudes between transverse spring sealing strips 23 which are J shaped in cross-section, the base of the J being biased against the upstream and downstream faces, 15 and 17, respectively, of blade 10. Seals 23, which are made of flexible shim stock, e.g., about 0.01 inch thick, and blade edge 22 are enclosed within air duct 20.

At the top of housing 11, blade 10 protrudes through blade withdrawal aperture 24, which is sealed to the atmosphere by transverse spring sealing strips 25. A second pair of transverse spring sealing strips 26 cooperates with strips 25 to form transverse void space 27, which is supplied with purge air by fan 21, hose 28, and pipe 29.

Each of the side seal assemblies 16 and 18 is comprised of a U shaped channel formed by flange 30, edge member 31, and plate 33. Positioned lengthwise within the U shaped channel just described as a resiliently compressible rope (a so-called "tadpole seal") 34, which, together with sealing strip 32, is held in place by plate 33, threaded stud 35, and nut 36. The resilience of rope 34 urges sealing strip 32 against blade 10.

With regard to the side sealing strips 32, when the air purge fan 21 is operating so as to create an air pressure within void space 14 which is greater than the gas pressure adjacent the upstream and downstream faces, 15 and 17, of gate 10, then the higher pressure air will steadily escape void space 14 through any small openings that might exist between sealing strips 32 and gate 10, thereby preventing the leakage of upstream gas around the edges of blade 10. Upper transverse air purge chamber 27 operates in the same manner to prevent the leakage of upstream gas between sealing strip 25 and upstream face 15 of blade 10. When the blade is in the valve-closed position, the high pressure air in duct 20 similarly prevents the escape of upstream gas around the bottom edge 22 of gate 10.

Raising and lowering of gate 10 is made possible by endless chains 37, attached by pendant rings (not shown) to the top of gate 10 and passing around sprockets 38 and 39. Sprockets 39 are turned by drive shaft 40, which is linked by gear reduction box 41 to manually operated wheel 42.

As illustrated in FIG. 5, when blade 10 is intermediate the valve-open and valve-closed positions, a triangular opening 43 is formed by the forward edge 22 of blade 10 partially spreading apart opposed sealing strips 32. If air fan 21 is operating when the valve is in that position, any solids which have collected in void space 14 and air duct 20 are tossed up by the agitated air, and part of them are blown out of void space 14 through opening 43, thereby accomplishing a self-cleaning action.

When gate 10 is withdrawn completely from housing 11, for instance for servicing, as shown in FIG. 4, sealing strips 25 come together, as do sealing strips 26, thereby preventing the escape of conduit gases through pipe 29 and hose 28 to fan 21. Similarly, as shown in FIG. 5, bottom transverse sealing strips 23 are urged together upon withdrawal of gate 10 to seal against the escape of conduit gases through air duct 20 and past fan 21 to the atmosphere. In the same manner, side sealing strips 32 close upon one another when gate 10 is withdrawn from housing 11, also preventing the escape of conduit gases past fan 21 and into the atmosphere.

I claim:

1. In a sliding gate valve comprising
   a housing having a fluid flow opening therethrough and an aperture in its wall;
   a gate member having opposite upstream and downstream faces and terminating in peripheral edges, said gate member being adapted for sliding movement through the aperture between valve-open position, wherein the gate member is withdrawn from the housing, and valve-closed position, wherein the gate member extends through the aperture and into the housing to restrict the flow of fluid through the housing, two of the peripheral edges of the gate member being side edges, by which is meant opposite edges which are parallel to the direction of sliding movement of the gate member, and one of the peripheral edges being a forward edge, by which is meant the leading edge during movement of the gate member from valve-open position to valve-closed position;
   means forming an enclosed void space between at least one of the gate member side edges and the adjacent wall of the housing when the gate member is in the valve-closed position, said void space running substantially the entire length of the side edge, said void space forming means including sealing means cooperating with the gate member when in the valve-closed position to seal against the leakage of upstream and downstream fluids into the void space; and
   means for injecting pressurized fluid from a source external to said housing into said void space;
   the IMPROVEMENT wherein said sealing means comprise
   a downstream seat mounted on the interior wall of the housing in such a manner that the downstream face of the gate member abuts against the seat when in the valve-closed position, and
   an upstream seat assembly comprised of a rigid, elongated channel means mounted on the interior wall of the housing in such a manner that the channel is parallel to and upstream of the gate member when in the valve-closed position, said channel having a back wall and at least one side wall, said back wall being substantially parallel to the plane of said gate member; a rope which is resiliently compressible across its width positioned lengthwise in said channel; and elongated metal strip, with opposing front and rear surfaces, being flexibly attached along the first of its two long edges to a side wall of the channel so as to sandwich the rope between the back wall of the channel and the rear surface of the metal strip; said seat assembly being positioned such that when the gate member is in the valve-closed position the gate member's upstream face presses against the front surface of the metal strip in sealing engagement therewith, urging the strip against the rope, the resilience of the rope providing a pressure counter to that exerted by the gate member; said downstream seat and upstream seat assembly being so adapted that in the valve-open position the metal strip's front surface is urged against the downstream seat in sealing engagement, effectively closing the void space, and in positions intermediate valve-open and valve-closed, a generally triangular opening to said void space is formed immediately in front of the forward edge of the gate member.

2. The sliding gate valve of claim 1 wherein the metal strip's second long edge is unattached and generally points toward the side edge of the gate member.

3. The sliding gate valve of claim 1 wherein the metal strip has a longitudinal bend adjacent to the unattached long edge, the bend being directed away from the gate face.

4. The sliding gate valve of claim 1 wherein the channel has a generally U shaped cross section.

5. The sliding gate valve of claim 1 wherein the metal strip is made of spring tempered steel.

6. The sliding gate valve of claim 1 wherein the metal strip is formed from an elongated rectangular sheet of metal which has a longitudinal bend in it providing a point of flexibility with respect to the side wall of the channel.

7. The sliding gate valve of claim 1 wherein the rope is formed of wire mesh.

8. The sliding gate valve of claim 7 wherein the wire mesh is ensheathed in a woven fabric.

9. The sliding gate valve of claim 1 wherein the housing and the gate member are both rectilinear, and both side edges of the gate member are associated with void space forming means comprising said improved sealing means.

10. The sliding gate valve of claim 9 wherein each of the downstream seats is provided by an assembly which is a mirror image of said upstream seat assembly.

11. The sliding gate valve of claim 10, additionally including means forming enclosed void spaces (a) between the top edge of the gate member and the adjacent wall of the housing and (b) between the bottom edge of the gate member and the adjacent wall of the housing, when the gate member is in the valve-closed position, and said last mentioned void spaces running substantially the entire lengths of said top and bottom edges of the gate member.

12. The sliding gate valve of claim 11 wherein each channel has a generally U shaped cross section.

13. The sliding gate valve of claim 12, wherein said metal strip is made of spring tempered steel.

14. The sliding gate valve of claim 13 wherein each of the metal strips is formed from an elongated rectangular sheet of metal which has a longitudinal bend in it providing a point of flexibility with respect to the side wall of the channel.

15. The sliding gate valve of claim 14 wherein the rope is formed of wire mesh.

16. The sliding gate valve of claim 15 wherein the wire mesh is ensheathed in a woven fabric.

17. The sliding gate valve of claim 16 wherein each metal strip's second long edge is unattached and generally points toward the side edge of the gate member.

18. The sliding gate valve of claim 17 wherein each metal strip has a longitudinal bend adjacent to the unattached long edge, the bend being directed away from the gate face.

19. The sliding gate valve of claim 18 wherein the fluid injection means is operable to force air into said void space.

20. The sliding gate valve of claim 15 wherein each metal strip's second long edge is unattached and generally points toward the side edge of the gate member.

21. The sliding gate valve of claim 20 wherein each metal strip has a longitudinal bend adjacent to the unattached long edge, the bend being directed away from the gate face.

* * * * *

UNITED STATES PATENT AND TRADEMARK OFFICE
CERTIFICATE OF CORRECTION

PATENT NO. : 4,176,673
DATED : December 4, 1979
INVENTOR(S) : Peter J. Connor

It is certified that error appears in the above-identified patent and that said Letters Patent are hereby corrected as shown below:

Column 3, line 59, "the" should read --to--;

line 60, "gage" should read --gate--.

Column 5, line 6, "as" should read --is--.

Signed and Sealed this

Eighteenth Day of March 1980

[SEAL]

Attest:

SIDNEY A. DIAMOND

Attesting Officer    Commissioner of Patents and Trademarks